United States Patent
Kobayashi (10) Patent No.: US 11,930,440 B2
(45) Date of Patent: Mar. 12, 2024

(54) COMMUNICATION CONTROL APPARATUS, NON-TRANSITORY COMPUTER READABLE MEDIUM STORING COMMUNICATION CONTROL PROGRAM, AND COMMUNICATION CONTROL SYSTEM FOR PREVENTING TERMINAL FROM CONNECTING TO FAILED WIRELESS COMMUNICATION LINE

(71) Applicant: FUJIFILM Business Innovation Corp., Tokyo (JP)

(72) Inventor: Ayumi Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 629 days.

(21) Appl. No.: 17/069,833

(22) Filed: Oct. 13, 2020

(65) Prior Publication Data

US 2021/0385726 A1   Dec. 9, 2021

(30) Foreign Application Priority Data

Jun. 3, 2020   (JP) .................................. 2020-097215

(51) Int. Cl.
   *H04W 40/34*   (2009.01)
   *H04W 40/12*   (2009.01)

(52) U.S. Cl.
   CPC ........... *H04W 40/34* (2013.01); *H04W 40/12* (2013.01)

(58) Field of Classification Search
   CPC ....... H04L 45/22; H04L 45/28; H04L 47/805; H04L 47/808; H04L 47/78; H04W 40/34; H04W 40/12; H04W 36/30
   See application file for complete search history.

(56) References Cited

U.S. PATENT DOCUMENTS

| | | | | |
|---|---|---|---|---|
| 2018/0359337 A1* | 12/2018 | Kodaypak | ........... | H04L 41/0897 |
| 2019/0116097 A1* | 4/2019 | Shimojou | ............... | H04L 45/40 |
| 2020/0044943 A1* | 2/2020 | Bor-Yaliniz | ............ | H04L 43/16 |
| 2020/0322846 A1* | 10/2020 | Hampali | ............... | H04W 8/205 |
| 2021/0321325 A1* | 10/2021 | Srivastava | .......... | H04L 41/0893 |
| 2021/0385726 A1* | 12/2021 | Kobayashi | ............. | H04L 45/22 |

(Continued)

FOREIGN PATENT DOCUMENTS

JP   2017046129   3/2017

OTHER PUBLICATIONS

"Network Slicing as a Service: Enabling Enterprises' Own Software-Defined Cellular Networks"; Zhou et al.; IEEE Communications Magazine; Jul. 2016 (Year: 2016).*

*Primary Examiner* — Benjamin H Elliott, IV
(74) *Attorney, Agent, or Firm* — JCIPRNET (57) ABSTRACT

A communication control apparatus includes a processor configured to acquire communication information representing connection information of a first network slice, which is assigned as a connection destination of a terminal used by a user, among wireless communication lines respectively provided by communications carriers, from a control apparatus that controls the first network slice; and perform control to switch a network slice such that a second network slice different from the first network slice is assigned to the terminal, in a case where a deterioration of a communication quality of the first network slice is notified by using the communication information.

16 Claims, 5 Drawing Sheets

(56) References Cited

U.S. PATENT DOCUMENTS

| | | | |
|---|---|---|---|
| 2022/0141713 A1* | 5/2022 | Jagannatha | H04W 48/17 370/328 |
| 2023/0010111 A1* | 1/2023 | Rahman | H04L 41/0836 |
| 2023/0056120 A1* | 2/2023 | Fu | H04W 36/12 |

* cited by examiner

| UE | CONTRACT LINE | BACKUP PRESENCE/ABSENCE | DEFAULT LINE |
|---|---|---|---|
| UE-1 | CARRIER A CARRIER B | PRESENCE | CARRIER A |
| UE-2 | CARRIER B CARRIER C | PRESENCE | NOT SET |
| UE-3 | CARRIER C | ABSENCE | NOT SET |
| ⋮ | ⋮ | ⋮ | ⋮ |

COMMUNICATION CONTROL APPARATUS, NON-TRANSITORY COMPUTER READABLE MEDIUM STORING COMMUNICATION CONTROL PROGRAM, AND COMMUNICATION CONTROL SYSTEM FOR PREVENTING TERMINAL FROM CONNECTING TO FAILED WIRELESS COMMUNICATION LINE

CROSS-REFERENCE TO RELATED APPLICATIONS

This application is based on and claims priority under 35 USC 119 from Japanese Patent Application No. 2020-097215 filed Jun. 3, 2020.

BACKGROUND

(i) Technical Field

The present invention relates to a communication control apparatus, a non-transitory computer readable medium storing a communication control program, and a communication control system.

(ii) Related Art

JP2017-046129A discloses a network node which transfers data, is connected to a management device that manages the network node, has a logic that in a case where a predetermined event is detected, notifies the management device of the detection of the event, identifies a virtual network of traffic of data to be transferred, specifies a logic defined in the identified virtual network, and executes the specified logic for the traffic of the virtual network.

SUMMARY

The 5th generation mobile communication system called "5G" is considered to be able to connect to a radio access network such as WiFi (registered trademark) other than a Next Generation-Radio Access Network (NG-RAN). Therefore, a terminal using 5G may select a wireless communication line to be used according to an application or a communication environment from among a plurality of wireless communication lines having different architectures such as 3GPP and non-3GPP to perform communication.

Such a terminal that is connectable to a plurality of wireless communication lines may perform an operation to switch to another wireless communication line, in a case where the user refers to, for example, a jitter or the like in the connected wireless communication line, and determines that the line quality is lower than the specified line quality.

However, the information that the user can use to determine the switching of the wireless communication line is only information, acquired by the terminal through communication, indirectly indicates the status of the wireless communication line. Therefore, the user cannot determine whether a failure has actually occurred in the wireless equipment of the communications carrier that provides the wireless communication line, and continues to connect the terminal to the wireless communication line in which the failure has occurred.

Aspects of non-limiting embodiments of the present disclosure relate to a communication control apparatus, a non-transitory computer readable medium storing a communication control program, and a communication control system, which are capable of preventing a terminal, that is connectable to a wireless communication line provided by each telecommunications carrier, from continuing to connect to a wireless communication line in which a failure occurs, as compared with a case where the wireless communication line of the connection destination is switched based on only the information acquired by the terminal.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a communication control apparatus includes a processor configured to acquire communication information representing connection information of a first network slice, which is assigned as a connection destination of a terminal used by a user, among wireless communication lines respectively provided by communications carriers, from a control apparatus that controls the first network slice; and perform control to switch a network slice such that a second network slice different from the first network slice is assigned to the terminal, in a case where a deterioration of a communication quality of the first network slice is notified by using the communication information.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the drawings. The identical components and the identical processes are denoted by the identical reference symbols throughout the drawings, and redundant description will be omitted.

Figure 1:
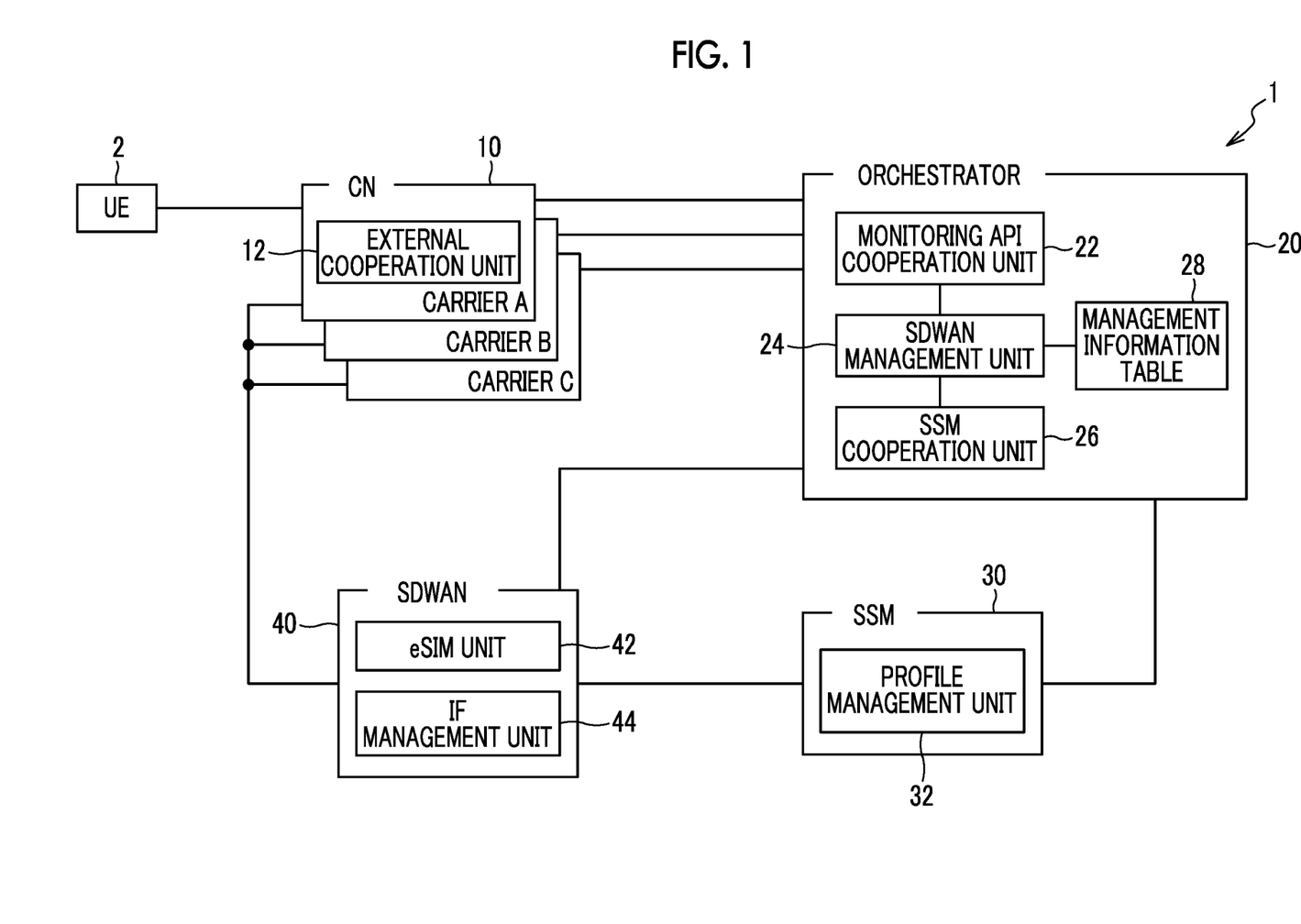
FIG. 1 is a diagram illustrating a system configuration example of a communication control system.

FIG. 1 is a diagram illustrating a system configuration example of a communication control system 1 according to the present exemplary embodiment. The communication control system 1 includes a Core Network (CN) 10 of a fifth generation mobile communication system (hereinafter referred to as "5G system"), an orchestrator 20 connected to the CN 10 via an external data network (for example, the Internet) different from the network provided by the 5G system (hereinafter referred to as "5G network"), a Subscription Manager (SSM) 30 connected to the orchestrator 20 via the external data network, and a Software Defined WAN (SDWAN) 40 which is an example of a wide area line connected to the orchestrator 20, the SSM 30, and the CN 10 via the external data network.

The CN 10 is a network including a control apparatus that controls the communication in the 5G system, and is configured with facilities used for providing 5G services, such as various exchanges and subscriber information management devices. A terminal used by a user (hereinafter referred to as "UE 2") and the CN 10 are connected by a wireless communication line provided by a 5G system, and the CN 10 provides the UE 2 with a 5G service.

The CN 10 is constructed for each telecommunications carrier that provides 5G services, and in the example of the communication control system 1 illustrated in FIG. 1, three telecommunications carriers (carrier A, carrier B, and carrier C) respectively construct the CN 10. An Embedded Universal Integrated Circuit Card (eUICC) that supports an Embedded Subscriber Identity Module (eSIM) is pre-integrated with the UE 2, and the profile of the telecommunications carrier of the contracted party is written in the eUICC, so that the UE 2 can use the 5G service provided by the telecommunications carrier who has written the profile in the eUICC.

The profile written in the eUICC includes, for example, line information necessary for connection to the 5G network, such as Mobile Station International Subscriber Directory Number (MSISDN) assigned to the UE 2, and access point information to which the UE 2 is connected. Note that MSISDN is a mobile phone number assigned to the UE 2. It is assumed that the user of the UE 2 has a 5G service usage contract with at least one telecommunications carrier, but there is one 5G network that is connectable at the same time, and the UE 2 is connected to the 5G network provided by the telecommunications carrier compatible with the profile written in the eUICC. Telecommunications carriers are also referred to as "carriers". The profile written in the eUICC is also referred to as the eSIM profile.

Each CN 10 includes an external cooperation unit 12, which functions as an interface that provides various types of information about the 5G system to an external device such as an orchestrator 20 connected to an external data network different from the 5G network.

The orchestrator 20 is a communication control apparatus that controls the switching of the wireless communication line used by the UE 2, and includes the functional units of the monitoring API cooperation unit 22, the SDWAN management unit 24, and the SSM cooperation unit 26, and the management information table 28.

The monitoring API cooperation unit 22 acquires communication information on a wireless communication line used by the UE 2, through an Application Programming Interface (API) prepared in advance. Specifically, in a case where the monitoring API cooperation unit 22 designates the MSISDN of the UE 2 in the API prepared for acquiring the communication information, the communication information on the wireless communication line used by the UE 2 associated with the designated MSISDN is obtained.

The communication information includes carrier identification information for specifying a carrier used by the UE 2, network slice identification information for identifying a wireless communication line used by the UE 2, and an assignment status of the UE 2 and the network slice, which is an example of the wireless communication line assigned to the UE 2, represented by the network slice identification information.

The network slice is a technology for virtually dividing resources such as the processing capacities of facilities such as servers and routers and the bandwidth of the network, used for providing 5G services, and combining the divided virtual resources to construct a virtual network (slice) on the 5G network between the UE 2 and the CN 10.

In a case where the network slice is not assigned to the UE 2, this means that the UE 2 and the CN 10 are disconnected. Therefore, the assignment status between the UE 2 and the network slice is used as connection information indicating the connection status between the UE 2 and the CN 10.

The connection information includes "Loss of connectivity" indicating that the assignment between the UE 2 and the network slice is canceled due to some cause and data transfer is disabled between the UE 2 and the CN 10, or "UE reachability" indicating that the network slice is again assigned to the UE 2 to which the assignment has been canceled, and data transfer is enabled between the UE 2 and the CN 10. In a case where "Loss of connectivity" is notified by the communication information, the orchestrator 20 recognizes that some failure has occurred in the network slice assigned to the UE 2 and in a case where "UE reachability" is notified, the orchestrator 20 recognizes that the failure that has occurred in the network slice is restored. The presence/absence of a failure in the network slice assigned to the UE 2 is an example of an attribute indicating the communication quality of the network slice.

The monitoring API cooperation unit 22 notifies the SDWAN management unit 24 of the acquired network slice status.

The SDWAN management unit 24 designates the UE 2, that is the monitoring target of the network slice, for the monitoring API cooperation unit 22, and performs switching of the network slice to be assigned to the UE 2, according to the assignment state of the network slice received from the monitoring API cooperation unit 22.

In a case where the UE 2 that is the monitoring target of the network slice is designated and the network slice is switched, the SDWAN management unit 24 refers to the management information table 28 that stores management information about the UE 2 and the network slice.

Figure 2:
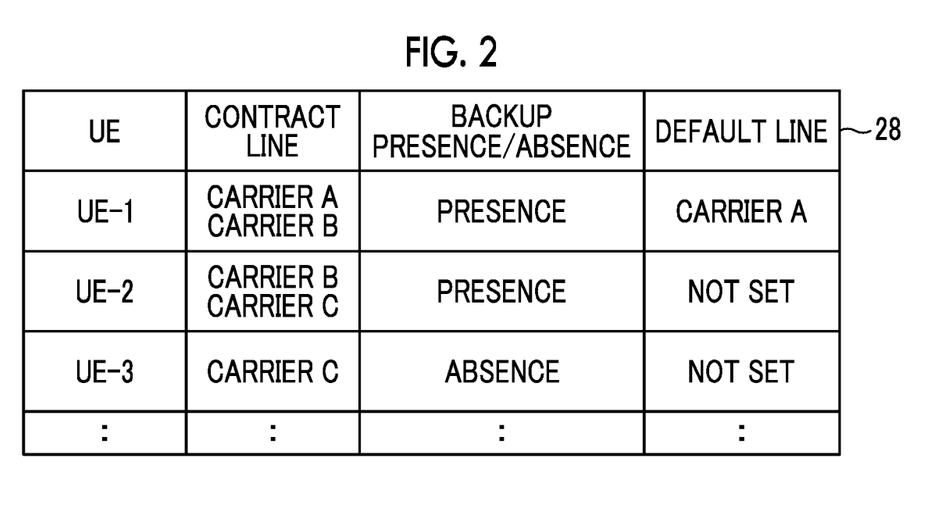
FIG. 2 is a diagram illustrating an example of a management information table.

FIG. 2 is a diagram illustrating an example of the management information table 28. The management information table 28 includes a UE field, a contracted line field, a backup presence/absence field, and a default line field.

Identification information for uniquely identifying the UE 2 managed by the orchestrator 20, such as "UE-1", "UE-2", . . . , is set in the UE field. As the identification information for uniquely identifying the UE 2, for example, the MSISDN of the UE 2 is used, but the manufacturing number (IMEI) of the UE 2 may be used. In a case where the identification information other than MSISDN is set in the UE field of the management information table 28, it is assumed that the orchestrator 20 additionally has association information for obtaining the MSISDN from the identification information of the UE 2.

In the contracted line field, line information regarding all 5G services available in the UE 2 is set. Therefore, in the case of the UE 2 connectable to 5G networks provided by a plurality of carriers, the line information on the line contracted with each carrier is set in the contracted line field. Specifically, in addition to the carrier identification information on the carrier that can be used by the UE 2, line information including the network slice identification information assigned to the UE 2 in the carrier is set in the contracted line field.

The network slice assigned to the UE 2 is provided with the network slice identification information, which is an example of identification information for identifying a network slice for each communications carrier. Therefore, the orchestrator 20 designates the network slice by using the network slice identification information.

In a case where a failure occurs in the network slice assigned to the UE 2, backup information, indicating whether or not there is another network slice (backup line) that can be assigned, is set in the backup presence/absence field. In a case where "Presence" is set in the backup presence/absence field, it means that there is another network slice that can be assigned, and in a case where "Absence" is set, it means that there is no network slice that can be assigned, other than the network slice in which a failure has occurred.

Among the network slices that can be assigned to the UE 2, the line information on the network slice that is preferentially assigned to UE 2 is set in the default line field. Line information on any network slice, among the network slices that can be assigned to the UE 2, may be set in the default line field, but for example, line information on the network slice which is most useful to the user, such as a network slice with the lowest communication cost or a network slice with unlimited usable data capacity is set in the default line field.

Hereinafter, the network slice represented by the line information set in the default line field of the management information table 28 will be referred to as a "priority network slice". The priority network slice is designated by the user of each UE 2. The management information table 28 does not necessarily need to be stored in the orchestrator 20, and may be stored in an external apparatus that can be referred to by the orchestrator 20.

In a case where switching the network slice to be assigned to the UE 2 due to the occurrence and restoration of the failure in the network slice, the SDWAN management unit 24 refers to the management information table 28 and selects the network slice to be the switching destination. The SDWAN management unit 24 notifies the SSM cooperation unit 26 of the MSISDN of the UE 2 that is the switching target of the network slice and the line information on the network slice that is the switching destination.

For convenience of explanation, the network slice assigned to the UE 2 before switching of the network slice may be referred to as "original line", the network slice which is a switching destination may be referred to as "switching destination line", and the network slice set in the default line field may be referred to as a "default line". The original line is an example of the first network slice according to the present exemplary embodiment, and the switching destination line is an example of the second network slice according to the present exemplary embodiment.

The SSM cooperation unit 26 acquires the identification information of the eUICC in the UE 2, that is, the EID, associated with the MSISDN received from the SDWAN management unit 24. The orchestrator 20 refers to an EID table that manages the association between MSISDN and EID, for example, and acquires the EID corresponding to MSISDN. The EID table may be managed by the orchestrator 20 or an external apparatus other than the orchestrator 20. In a case where managing the EID table by the orchestrator 20, the EID table and the management information table 28 may be integrated and managed.

The SSM cooperation unit 26 performs control in cooperation with the SSM 30 such that the profile written in the eUICC of the UE 2 that is the switching target of the network slice is rewritten to the profile corresponding to the line information on the switching destination line. Therefore, the SSM cooperation unit 26 notifies the SSM 30 of the line designation message including the EID for specifying the eUICC of which profile is to be switched and the line information of the switching destination line.

The SSM 30 is a server that manages an eSIM profile and includes a profile management unit 32. The profile management unit 32 downloads the profile corresponding to the line information of the switching destination line, to the eUICC corresponding to the EID included in the line designation message received from the SSM cooperation unit 26 of the orchestrator 20, validates the downloaded profile, and notifies the SDWAN 40 of an instruction message for instructing to switch the profile.

The SDWAN 40 is a Wide Area Network (WAN) that can be centrally managed through software, performs line control between bases for each user according to a user policy defined in advance, and controls traffic. The SDWAN 40 constructs a virtual network on a physical network by setting routers and the like according to a user policy, and realizes secure communication between bases.

The WAN control apparatus that controls the SDWAN 40 includes an eSIM unit 42 and an IF management unit 44.

In a case of receiving the instruction message from the SSM 30, the eSIM unit 42 transmits the profile, which is designated in the instruction message, to the eUICC designated in the instruction message via the CN 10, and rewrites the profile of the UE 2 to the profile of the switching destination line.

In a case where the profile rewriting by the eSIM unit 42 is completed, the IF management unit 44 notifies the SDWAN management unit 24 of the orchestrator 20 of a completion notification. Thus, the current network slice assigned to the UE 2 is recognized by the orchestrator 20.

Note that the functional units corresponding to the eSIM unit 42 and the IF management unit 44 may be provided in the UE 2 instead of the SDWAN 40. In this case, the SSM 30 transmits the instruction message to the UE 2 associated with the EID via the SDWAN 40. The UE 2 that has received the instruction message downloads the profile of the designated switching destination line from the SSM 30, and rewrites the current profile to the profile of the switching destination line. After that, the UE 2 notifies the SDWAN management unit 24 of the orchestrator 20 of a completion notification notifying that the profile rewriting is completed.

Figure 3:
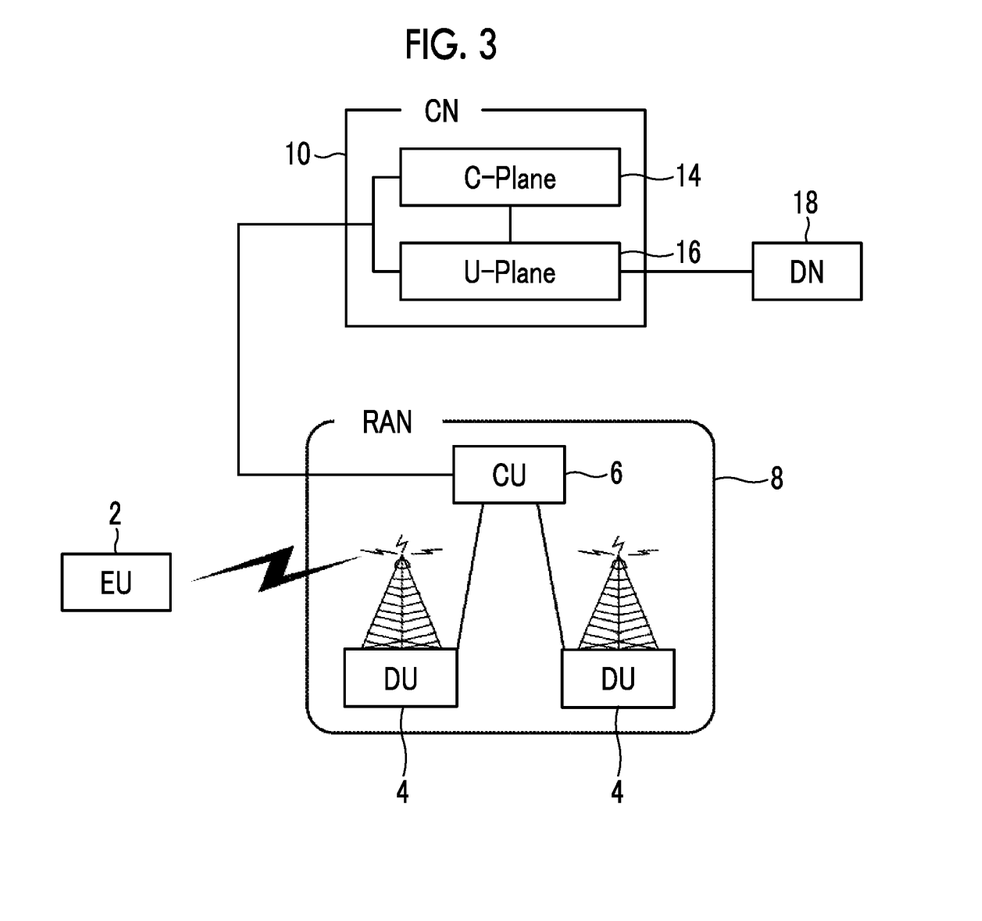
FIG. 3 is a diagram illustrating a configuration example of a 5G network.

Next, a 5G network including the CN 10 will be described in detail.

FIG. 3 is a diagram illustrating a configuration example of a 5G network. The 5G network includes a Radio Access Network (RAN) 8 and a CN 10.

The RAN 8 is a base station network wirelessly connected to the UE 2, and is divided into a Distributed Unit (DU) 4 that provides a wireless antenna function and a Centralized Unit (CU) 6 that provides a base station function. Since the CU 6 is connected to at least one DU 4 and communication with the EU 2 is performed via the DU 4, the DU 4 may be referred to as a distributed node and the CU 6 may be referred to as an aggregation node. The 5G network may include a plurality of RANs 8.

On the other hand, the CN 10 is configured to include a C-Plane 14 and a U-Plane 16, and the C-Plane 14 and the U-Plane 16 are connected to the CU 6 of each RAN 8.

The C-Plane 14 is a functional unit that performs communication control of the 5G network, and establishes or disconnects communication with the EU 2. The U-Plane 16 is a functional unit that performs data transfer, and transfers data under the control of the C-Plane 14. The data transfer is not performed within the 5G network, and is also performed with the external network DN 18 different from the 5G network. The DN 18 includes, for example, the Internet and SDWAN 40.

Figure 4:
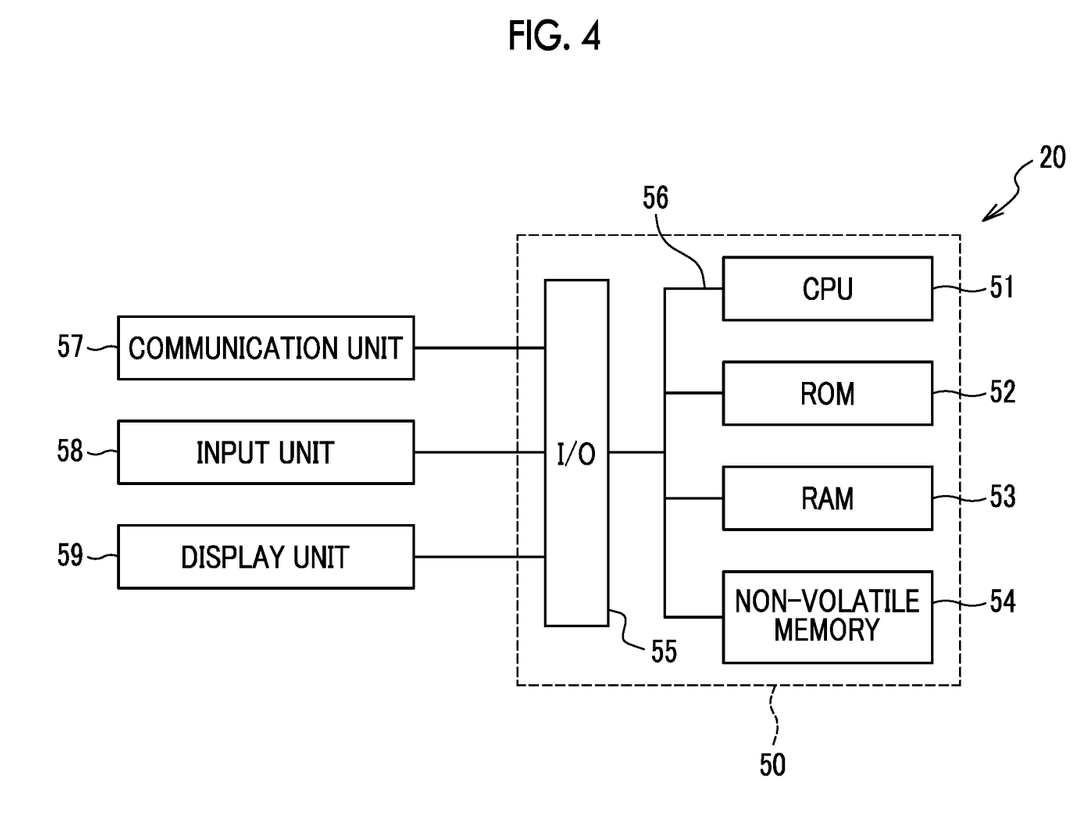
FIG. 4 is a diagram illustrating a configuration example of an electric system in an orchestrator.

Next, a configuration example of an electric system in the orchestrator 20 will be described.

FIG. 4 is a diagram illustrating a configuration example of an electric system in the orchestrator 20. The orchestrator 20 is configured by using a computer 50, for example.

The computer 50 includes a central processing unit (CPU) 51 that performs the process of each functional unit of the orchestrator 20 illustrated in FIG. 1, a read only memory (ROM) 52 that stores a communication control program that causes the computer 50 to function as the orchestrator 20, a random access memory (RAM) 53 used as a temporary work area of the CPU 51, a non-volatile memory 54, and an input/output interface (I/O) 55. The CPU 51, the ROM 52, the RAM 53, the non-volatile memory 54, and the I/O 55 are connected to each other via a bus 56.

The non-volatile memory 54 is an example of a storage device that retains stored information even in a case where power supplied to the non-volatile memory 54 is cut off, and for example, a semiconductor memory is used, but a hard disk may be used. Information that needs to be stored even in a case where the power of the orchestrator 20 is cut off, such as the management information table 28, is stored in the non-volatile memory 54.

The non-volatile memory 54 does not necessarily need to be built in the computer 50, and may be, for example, a portable storage device that can be attached to and detached from the computer 50.

A communication unit 57, an input unit 58, and a display unit 59 are connected to the I/O 55, for example.

The communication unit 57 is connected to the DN 18, and has a communication protocol for performing data communication with each device such as the CN 10, SSM 30, and SDWAN 40 and a network.

The input unit 58 is a device that receives a user's instruction and notifies the CPU 51 of the instruction. For example, a button, a touch panel, a keyboard, a mouse, or the like is used. In a case of receiving an instruction by voice, a microphone may be used as the input unit 58.

The display unit 59 is an example of a device that visually displays information processed by the CPU 51, and for example, a liquid crystal display, an organic electro luminescence (EL) display, or the like is used.

The various units connected to the I/O 55 are examples, and as necessary, a unit different from the unit illustrated in FIG. 4, such as an image forming unit that forms an image on a recording medium such as paper may be connected to the I/O 55. Further, in a case where the orchestrator 20 is installed in an unmanned data center or the like, the input unit 58 and the display unit 59 are not always necessary. In this case, the orchestrator 20 may receive a user's instruction through the communication unit 57, and transmit the information that the orchestrator 20 attempts to display on the display unit 59 to another device through the communication unit 57.

Figure 5:
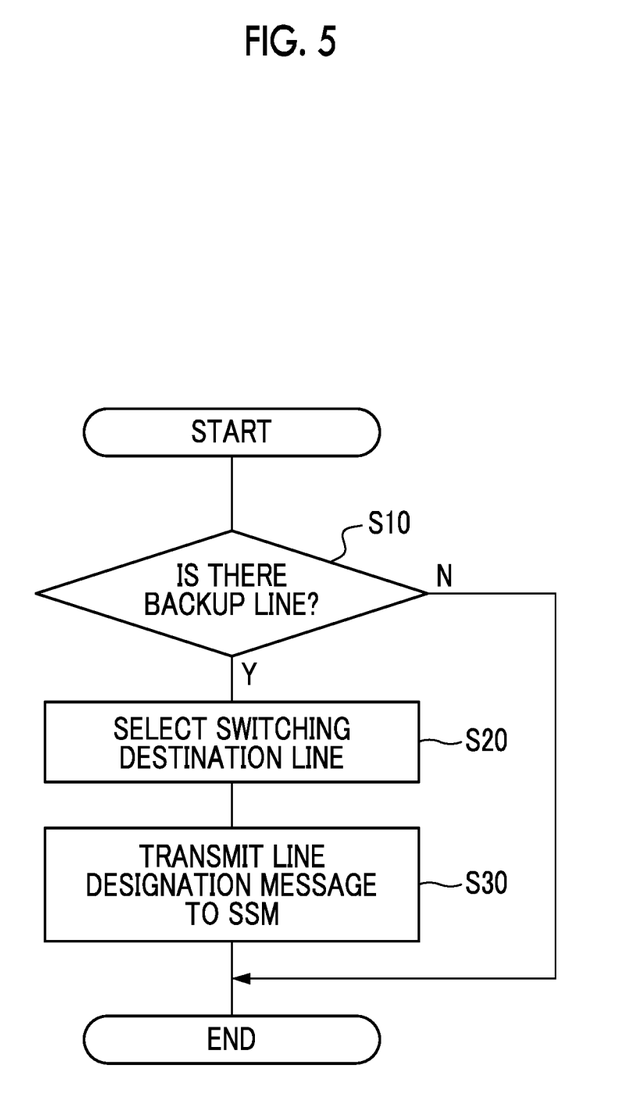
FIG. 5 is a flowchart illustrating an example of a network slice switching process executed in a case where a failure occurs in a network slice assigned to a UE.

Next, a network slice switching process in the orchestrator 20 will be described.

FIG. 5 is a flowchart illustrating an example of a network slice switching process executed by the CPU 51 of the orchestrator 20 in a case where the CN 10 notifies that a failure has occurred in a network slice assigned to the UE 2.

The communication control program that defines the network slice switching process is stored in advance in the ROM 52 of the orchestrator 20, for example. The CPU 51 of the orchestrator 20 reads the communication control program stored in the ROM 52 and executes the network slice switching process. In the description of the switching process of FIG. 5, the UE 2 to which the network slice, in which a failure occurrence is notified, is assigned is simply referred to as "UE 2".

In a case where the CN 10 notifies a failure occurrence in the network slice through the communication information, in step S10, the CPU 51 refers to the backup presence/absence field of the management information table 28 to determine whether or not the UE 2 has a backup line.

Since the network slice cannot be switched unless the backup line is present in the UE 2, the process ends the network slice switching process illustrated in FIG. 5, and waits for the failure in the network slice assigned to the UE 2 in which a failure has occurred to be restored.

On the other hand, in a case where the UE 2 has a backup line, the process proceeds to step S20.

In step S20, the CPU 51 refers to the management information table 28 and selects a switching destination line to be newly assigned to the UE 2. Specifically, the CPU 51 refers to the default line field of the management information table 28, and in a case where the default line is set in the default line field and a case where it is notified that a failure has not occurred in the default line, the CPU 51 selects the default line as the switching destination line.

In a case where the default line is not set in the UE 2 or a case where it is notified that a failure has occurred in the default line, the CPU 51 selects any one network slice for which a notification of the occurrence of a failure is not provided as the switching destination line, from among the network slices of which line information is set in the contracted line field. In a case where there are a plurality of switching destination line candidates, a switching destination line may be selected from among the switching destination line candidates, according to a selection criterion designated in advance by the user, for example, selecting a network slice with the lowest communication cost.

In step S30, the CPU 51 transmits to the SSM 30 a line designation message including the EID of the EU 2 of which profile is to be switched and the line information of the switching destination line selected in step S20. As described above, as described above, the SSM 30 notifies the SDWAN 40 of an instruction message for instructing profile switching, the profile of the switching destination line is written to the eUICC of the EU 2, and the network slice switching is performed.

In addition, the CPU 51 may designate a communication form of the instruction message in the line designation message such that the UE 2 is notified with priority over other messages of the instruction message for instructing the switching of the profile. For example, in the CN 10, the message transmitted by using the Short Message Service (SMS) is transmitted to the UE 2 with priority over the message transmitted by using another communication form, so that the CPU 51 may designate a line designation message such that an instruction message is to be transmitted by SMS. Further, the CPU 51 may designate a line designation message such that a designation message is to be transmitted by Hyper Text Transfer Protocol Secure (HTTPS) which is an example of encrypted communication. Since Secure Socket Layer (SSL) is used in a case where the communication form of the designation message is HTTPS, security performance related to communication is improved as compared with the case where Hyper Text Transfer Protocol (HTTP) is used as the communication format.

Figure 6:
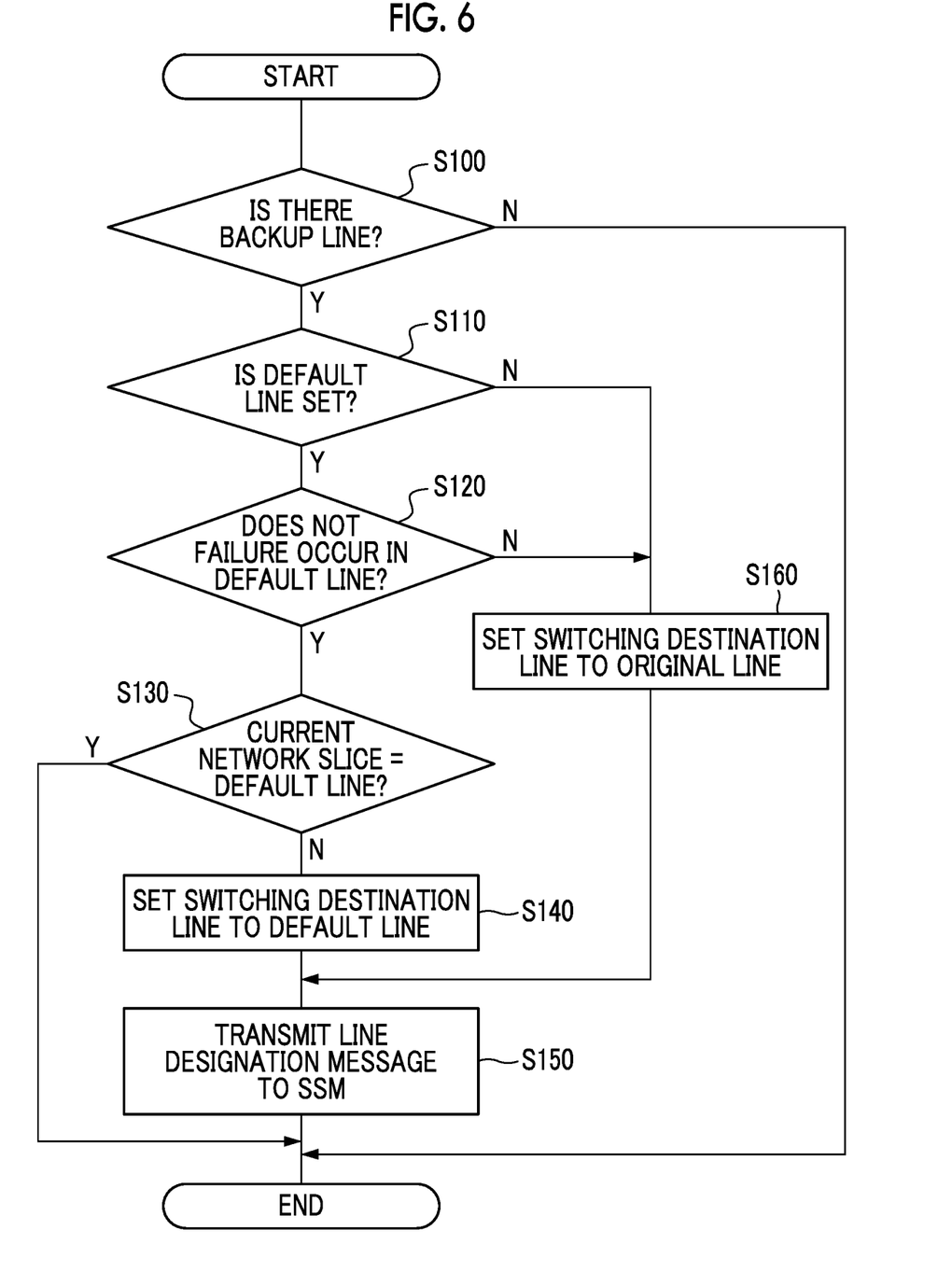
FIG. 6 is a flowchart illustrating an example of a network slice switching process executed in a case where a failure occurred in an original network slice assigned to the UE is restored.

On the other hand, FIG. 6 is a flowchart illustrating an example of a network slice switching process executed by the CPU 51 of the orchestrator 20, in a case where the network slice assigned to the UE 2 before the network slice switching, that is, the original line is restored. In the description of the switching process in FIG. 6, the UE 2 to which the restored network slice has been assigned before the switching is simply referred to as "UE 2".

In step S5100, the CPU 51 refers to the backup presence/absence field of the management information table 28 and determines whether the UE 2 has a backup line.

In a case where the UE 2 does not have the backup line, the network slice switching is not performed in the first place, and thus the network slice switching process illustrated in FIG. 6 is ended. That is, as the network slice is restored, the restored network slice is assigned to the UE 2.

On the other hand, in a case where the UE 2 has a backup line, the process proceeds to step S110.

In step S110, the CPU 51 refers to the default line field of the management information table 28 and determines whether the default line is set in the default line field of the UE 2. In a case where the default line is set in the default line field of the UE 2, the process proceeds to step S120.

In step S120, the CPU 51 determines whether the CN 10 notifies that a failure has not occurred in the default line of the UE 2. In a case where it is notified that a failure has not occurred in the default line of the UE 2, the process proceeds to step S130.

In step S130, the CPU 51 determines whether or not the current network slice assigned to the UE 2 is the default line of the UE 2. In a case where the current network slice assigned to the UE 2 is the default line of the UE 2, the switching process illustrated in FIG. 6 is ended. That is, in a case where the network slice assigned to the UE 2 is switched to the default line in the switching process in FIG. 5, due to the occurrence of a failure in the original line, even in a case where the original line is restored, the default line is continuously assigned to the UE 2.

On the other hand, in a case where it is determined in the determination process of step S130 that the current network slice assigned to the UE 2 is not the default line of the UE 2, the process proceeds to step S140.

In step S140, the CPU 51 sets the switching destination line of the UE 2 to the default line of the UE 2.

In step S150, the CPU 51 transmits to the SSM 30 a line designation message including the EID of the EU 2 of which profile is to be switched and the line information on the default line, and ends the switching process of FIG. 6.

That is, the CPU 51 performs control such that the default line is preferentially assigned to the UE 2, in a case where the default line is set in the UE 2 and no failure has occurred in the default line.

On the other hand, in a case where it is determined in the determination process of step S110 that the default line is not set in the default line field of the UE 2, and it is determined in the determination process of step S120 that the CN 10 notifies that a failure has occurred in the default line of the UE 2, the process proceeds to step S160.

In this case, the default line cannot be assigned to the UE 2. Therefore, in step S160, the CPU 51 sets the switching destination line of the UE 2 to the original line, and proceeds to step S150. That is, as the network slice assigned to the UE 2 before the switching of the network slice is restored, the CPU 51 returns a network slice to be assigned to the UE 2 to the original line that has been assigned to the UE 2 before the switching of the network slice.

Note that even in a case where it is notified that the original line is restored, the CPU 51 needs not necessarily return the network slice to be assigned to the UE 2 to the original line. For example, in a case where there are a plurality of network slices that can be used by the UE 2, any one network slice in which a failure occurrence is not notified may be assigned to the UE 2, among the contracted network slices. In this case, the CPU 51 may assign a network slice which is most useful to the user, based on the evaluation items such as the communication cost and the quality of the communication, among the network slices in which a failure occurrence is not notified. It is possible to determine whether the communication quality is good or bad, based on, for example, the radio field intensity of the radio wave connected to the UE 2. The CPU 51 may acquire the radio field intensity of the radio wave connected to the UE 2 through the external cooperation unit 12 of the CN 10.

An assignment of a current network slice may be maintained such that a new assigned current network slice can be continued to be assigned to the UE 2 as it is after switching the network slice.

In a case where switching the network slice to be assigned to the UE 2 in the network slice switching process illustrated in FIGS. 5 and 6, the network slice may be switched between different communications carriers or may be switched within the same communications carrier.

Further, a plurality of priority network slices may be set for each UE 2 in the default line field of the management information table 28. In this case, the priority order of the priority network slice, such as "first priority network slice" and "second priority network slice", is set in each network slice. Then, it is determined whether or not it is possible to assign a network slice to the UE 2 in order from the priority network slice with the highest priority, and the priority network slice with the highest priority, among the assignable priority network slices, may be assigned to the UE 2.

Although the present invention has been described above using the exemplary embodiment, the present invention is not limited to the scope described in the exemplary embodiment. Various modifications and improvements can be added to the exemplary embodiments without departing from the scope of the present invention, and the exemplary embodiments to which the modifications or improvements are added are also included in the technical scope of the present invention. For example, the order of processes may be changed without departing from the spirit of the present invention.

Further, in the exemplary embodiments, an example has been described in which the switching process of the network slice is realized by software, but the process equivalent to the flowcharts illustrated in FIGS. 5 and 6 may be mounted on, for example, an application specific integrated circuit (ASIC), a field programmable gate array (FPGA), or a programmable logic device (PLD) and processed by hardware. In this case, the processing speed can be increased as compared with the case where the network slice switching process is realized by software.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above-described exemplary embodiments, the aspect in which the communication control program is installed in the ROM 52 has been described, but the exemplary embodiment is not limited to this. The communication control program according to the exemplary embodiment can be provided in a form recorded in a storage medium readable by the computer 50. For example, the communication control program may be provided in a form recorded on an optical disc such as a compact disc (CD)-ROM or a digital versatile disc (DVD)-ROM. Further, the communication control program according to the exemplary embodiments may be provided in a form recorded in a portable semiconductor memory such as a universal serial bus (USB) memory or a memory card.

Further, the orchestrator 20 may acquire the communication control program from an external apparatus through the DN 18.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication control apparatus comprising a processor configured to
    acquire communication information representing connection information of a first network slice, which is assigned as a connection destination of a terminal used by a user, among wireless communication lines respectively provided by communications carriers, from a control apparatus that controls the first network slice; and
    perform control to switch a network slice to assign a second network slice different from the first network slice to the terminal, in a case where a deterioration of a communication quality of the first network slice is notified by using the communication information, wherein
    the processor is configured to refer to management information that manages information on each network slice assigned to the terminal, and switches the network slice assigned to the terminal in cooperation with the subscription manager, the network slice assigned to the terminal becomes a priority network slice to be preferentially assigned to the terminal, in a case where the priority network slice is set in the management information, and a failure in communication with the terminal having occurred in the priority network slice is not notified.

2. The communication control apparatus according to claim 1, wherein
    the processor is configured to control the switching of the network slice assigned to the terminal by switching a profile of the terminal in cooperation with a subscription manager that manages a profile of an Embedded Subscriber Identity Module (eSIM) assigned to the terminal.

3. The communication control apparatus according to claim 1, wherein
    the processor is configured to, in a case where the priority network slice for the terminal is not set in the management information, maintain the current network slice assignment to the terminal, even in a case where notification of restoration of communication quality of the first network slice is provided by using the communication information.

4. The communication control apparatus according to claim 2, wherein
    the processor is configured to, in a case where notification of restoration of communication quality of the first network slice is provided by using the communication information, switch the profile of the terminal in cooperation with the subscription manager such that the first network slice is assigned again to the terminal.

5. The communication control apparatus according to claim 2, wherein
    the processor is configured to designate a communication form of an instruction message for instructing the switching of the profile of the terminal such that the terminal is notified of the instruction message with priority over other messages.

6. The communication control apparatus according to claim 3, wherein
    the processor is configured to designate a communication form of an instruction message for instructing the switching of the profile of the terminal such that the terminal is notified of the instruction message with priority over other messages.

7. The communication control apparatus according to claim 4, wherein
    the processor is configured to designate a communication form of an instruction message for instructing the switching of the profile of the terminal such that the terminal is notified of the instruction message with priority over other messages.

8. The communication control apparatus according to claim 5, wherein
    the processor is configured to designate a short message service or Hyper Text Transfer Protocol (HTTPS) as a communication form of the instruction message.

9. The communication control apparatus according to claim 6, wherein
    the processor is configured to designate a short message service or Hyper Text Transfer Protocol (HTTPS) as a communication form of the instruction message.

10. The communication control apparatus according to claim 7, wherein
    the processor is configured to designate a short message service or Hyper Text Transfer Protocol (HTTPS) as a communication form of the instruction message.

11. The communication control apparatus according to claim 1, wherein
    the processor is configured to control switching of network slices to be assigned to the terminal such that the first network slice and the second network slice are network slices of different communications carriers.

12. The communication control apparatus according to claim 2, wherein
    the processor is configured to control switching of network slices to be assigned to the terminal such that the first network slice and the second network slice are network slices of different communications carriers.

13. The communication control apparatus according to claim 1, wherein
the processor is configured to control switching of network slices to be assigned to the terminal such that the first network slice and the second network slice are network slices of the same communications carrier.

14. The communication control apparatus according to claim 11, wherein
the processor is configured to designate a network slice to which the terminal is connected, by using identification information for identifying each network slice assigned to each communications carrier.

15. A non-transitory computer readable medium storing a communication control program causing
a computer to execute a process, the process comprising:
acquiring communication information representing connection information of a first network slice, which is assigned as a connection destination of a terminal used by a user, among wireless communication lines respectively provided by communications carriers, from a control apparatus that controls the first network slice; and
performing control to switch a network slice to assign a second network slice different from the first network slice to the terminal, in a case where a deterioration of a communication quality of the first network slice is notified by using the communication information, wherein
the computer is configured to refer to management information that manages information on each network slice assigned to the terminal, and switches the network slice assigned to the terminal in cooperation with the subscription manager, the network slice assigned to the terminal becomes a priority network slice to be preferentially assigned to the terminal, in a case where the priority network slice is set in the management information, and a failure in communication with the terminal having occurred in the priority network slice is not notified.

16. A communication control system comprising a processor that is configured to:
acquire communication information representing connection information of a first network slice, which is assigned as a connection destination of a terminal used by a user, among wireless communication lines respectively provided by communications carriers, from a control apparatus that controls the first network slice, and perform control to switch a network slice to assign a second network slice different from the first network slice to the terminal, in a case where a deterioration of a communication quality of the first network slice is notified by using the communication information, wherein the processor is configured to refer to management information that manages information on each network slice assigned to the terminal, and switches the network slice assigned to the terminal in cooperation with the subscription manager, the network slice assigned to the terminal becomes a priority network slice to be preferentially assigned to the terminal, in a case where the priority network slice is set in the management information, and a failure in communication with the terminal having occurred in the priority network slice is not notified; and
perform switching of a profile of the terminal which is instructed as a switching target in an instruction message for instructing the switching of the network slice, under control performed by a subscription manager that receives the instruction message, through a wide area line in which communication is controlled based on a policy defined by software.

* * * * *